(12) United States Patent
Blaisdell et al.

(10) Patent No.: US 10,633,478 B2
(45) Date of Patent: Apr. 28, 2020

(54) AQUEOUS POLYURETHANE DISPERSIONS

(71) Applicant: Taminco, Ghent (BE)

(72) Inventors: Jeffrey Blaisdell, Seekonk, MA (US); Michael Schmidt, Norristown, PA (US); Michael David Gernon, Las Vegas, NV (US)

(73) Assignee: Taminco, Ghent (BE)

( * ) Notice: Subject to any disclaimer, the term of this patent is extended or adjusted under 35 U.S.C. 154(b) by 0 days.

(21) Appl. No.: 15/547,957

(22) PCT Filed: Feb. 5, 2016

(86) PCT No.: PCT/EP2016/052536
§ 371 (c)(1),
(2) Date: Aug. 1, 2017

(87) PCT Pub. No.: WO2016/124251
PCT Pub. Date: Aug. 11, 2016

(65) Prior Publication Data
US 2018/0022854 A1    Jan. 25, 2018

(30) Foreign Application Priority Data

Feb. 6, 2015  (WO) ................ PCT/EP2015/052555

(51) Int. Cl.
| | |
|---|---|
| C08G 18/08 | (2006.01) |
| C08G 18/10 | (2006.01) |
| C08G 18/32 | (2006.01) |
| C08G 18/34 | (2006.01) |
| C08G 18/42 | (2006.01) |
| C08G 18/75 | (2006.01) |
| C08G 18/66 | (2006.01) |
| C09D 175/06 | (2006.01) |

(52) U.S. Cl.
CPC ..... *C08G 18/0871* (2013.01); *C08G 18/0823* (2013.01); *C08G 18/10* (2013.01); *C08G 18/3231* (2013.01); *C08G 18/348* (2013.01); *C08G 18/42* (2013.01); *C08G 18/4241* (2013.01); *C08G 18/6659* (2013.01); *C08G 18/758* (2013.01); *C09D 175/06* (2013.01)

(58) Field of Classification Search
None
See application file for complete search history.

(56) References Cited

U.S. PATENT DOCUMENTS

| | | |
|---|---|---|
| 3,573,049 A | 3/1971 | Kalenda |
| 3,905,929 A | 9/1975 | Noll |
| 3,920,598 A | 11/1975 | Reiff et al. |
| 4,237,264 A | 12/1980 | Noll et al. |
| 4,238,378 A | 12/1980 | Markusch et al. |
| 2006/0240264 A1* | 10/2006 | Gertzmann ........ C08G 18/0823 428/423.1 |
| 2011/0306724 A1 | 12/2011 | Campbell et al. |
| 2014/0248232 A1 | 9/2014 | Hong et al. |

FOREIGN PATENT DOCUMENTS

| | | |
|---|---|---|
| DE | 10 2007 028890 A1 | 5/2008 |
| EP | 1 717 257 A1 | 11/2006 |
| WO | WO 2005/090430 A1 | 9/2005 |
| WO | WO 2013/107822 A1 | 7/2013 |

OTHER PUBLICATIONS

Desmophen C2200 Product Datasheet (downloaded Nov. 29, 2018).*
Computer-generated English-language translation of DE102007028890A1 (May 2008).*
Jansson, Robert C.; "Polyurethane Dispersions Provide Sustainable Technology for Combining Performance with the Ease of Application"; Perstorp; Technical Information; Leaflet No. 0127; Jan. 2004; pp. 1-11.
Clausson A. et al.; "Polyurethane Dispersion Process by Hydrophilic Monomer Dissolution"; Paint and Coatings Industry; Jan. 2007; vol. 23; Issue 1; pp. 30-40.
ASTM D2370-98; Standard Test Method for Tensile Properties of Organic Coatings.
Notification of Transmittal of the International Search Report and the Written Opinion of the International Searching Authority with dated May 18, 2016 for International Application No. PCT/EP2016/052536.
Notification of Transmittal of the International Search Report and the Written Opinion of the International Searching Authority with dated Sep. 29, 2015 for International Application No. PCT/EP2015/052555.
PCT Direct / Informal Comments dated Feb. 5, 2016 filed in International Application No. PCT/EP2015/052555.

* cited by examiner

*Primary Examiner* — Vu A Nguyen
(74) *Attorney, Agent, or Firm* — Dennis V. Carmen

(57) ABSTRACT

An aqueous polyurethane dispersion comprising at least one isocyanate terminated polyurethane prepolymer prepared by reacting in the presence of at least one pyrrolidone selected from the group consisting of N-n-butylpyrrolidone, N-isobutylpyrrolidone, N-sec-butylpyrrolidone and N-tert-butylpyrrolidone, a mixture (M) which comprises: at least one polyisocyanate compound (a), at least one polyol compound (b), having a molecular weight Mw of 200 to 8000 and a hydroxyl functionality of 1.5 to 6, and at least one water dispersible enhancing component having at least one hydrophilic group or potentially hydrophilic group in water.

18 Claims, No Drawings

AQUEOUS POLYURETHANE DISPERSIONS

CROSS REFERENCE TO RELATED APPLICATIONS

This application is the national stage filing under 35 U.S.C. § 371 of PCT/EP2016/052536, filed Feb. 5, 2016, which claims priority to PCT Application PCT/EP2015/052555, filed Feb. 6, 2015, the contents of which are incorporated herein by reference in their entirety.

FIELD OF INVENTION

The present invention relates to aqueous polyurethane dispersions using at least a N—($C_4$-alkyl)-pyrrolidone as a prepolymer diluent, a dispersing agent and a coalescing agent wherein said aqueous polyurethane dispersions are very useful for the manufacture of films and coatings. The invention further relates to said polyurethane-based films and coatings and a process for the manufacturing thereof. The invention also relates to a process for the manufacturing of said aqueous polyurethane dispersions.

BACKGROUND OF THE INVENTION

Aqueous polyurethane dispersions (PUDs) are well known and have mainly been developed due to the evolution of legislation towards reducing the VOC (volatile organic concentration) and the creation of environmentally friendly products. Water-based or waterborne PUDs have gained increasing importance in a range of applications, due in large part to properties such as adhesion to a range of substrates, resistance to chemicals, solvents and water, abrasion resistance and flexibility. Water-based PUD show very good mechanical and chemical properties and match the regulatory restrictions for low volatile organic compound (VOC) containing raw paints.

Some efforts have also been directed to the development of substantially solvent-free aqueous polyurethane dispersions such as notably described in U.S. Patent Application Publication No. 2011/0306724 A1. Said solvent-free aqueous polyurethane dispersions are characterized by substantially no emission of volatile organic materials.

Aqueous polyurethane dispersions (PUDs) are thus used in the production of a variety of useful polyurethane products for example adhesives, sealants and coatings for various substrates including textile fabrics, plastic, wood, glass fibers, metals and the like. Chemical resistance, abrasion resistance, toughness, tensile strength, elasticity and durability are among the many desirable properties of these coatings. Their main advantages are the versatility of polyurethane (PU) systems and their effectiveness in producing 'tailor-made' coatings for a wide range of demanding applications. This results from the wide diversity of raw-materials which can be combined in different ways during the synthesis.

Several processes have been developed for the synthesis of PUD. All of these have a common first step, in which a medium molecular weight polymer (i.e. prepolymer) is formed by the reaction of suitable diols or polyols, in particular polyether, polyester or polycarbonate polyols with a molar excess of diisocyanates or polyisocyanates. Said prepolymer needs to be stabilized in order to allow its dispersion in water. There are two ways of stabilization, the first one consists of polymers stabilized by external emulsifiers, and the second one achieves stabilization by including hydrophilic centers in the polymer. Such hydrophilic centers may be one of three types: non-ionic, cationic and anionic groups. These hydrophilic groups fulfil the function as internal emulsifiers and make it possible to produce stable water-based emulsions. Thus, water-based PUDs are classified into anionic, cationic and nonionic systems.

U.S. Pat. No. 4,237,264 to Noll et al. and U.S. Pat. No. 4,238,378 to Markusch et al. notably describe that for coating applications, the polyurethane polymers can be stably dispersed in water by incorporating said hydrophilic groups or potentially hydrophilic groups into their backbone.

The industrial production of PUDs is nowadays a well-established technology. There are two main synthetic routes to produce PUDs: the acetone process and the pre-polymer process.

Jansson R. C. described in TECHNICAL INFORMATION. LEAFLET NO 0127. January 2004. Pages 1 (11) to 11 (11)) that the pre-polymer mixing process is a versatile and straightforward process for the preparations for PUDs, thereby permitting a great variation in PU formulations. This being said, the selection and the relative amounts of the polyurethane (PU) constitutional components (i.e. isocyanate, polyol component, chain extenders, emulsifiers, in particular internal emulsifiers, organic solvents, water, etc.), in the PUD formulation are thereby important for the targeted coating properties. This is also described by Clausson A. et al. in Paint and Coatings Industry, January 2007, Vol. 23, Issue 1, page 30.

N-Methylpyrrolidone (NMP) has frequently been used as the organic solvent in the preparation of PUDs. However, NMP is now known to cause reproductive toxicity (it is considered as being reprotoxic) and is being labeled in the EU as "reprotoxic category 2" as from the 1st of December 2010. Formulations containing >0.3% of NMP have to be labelled as such. Consequently, the use of the solvent is restricted to professional users. NMP has been placed on the REACH "Substance of Very High Concern" (SVHC) list and is expected, sooner or later, to be placed under authorization or restriction.

Despite the efforts that have been directed to the development of substantially solvent-free aqueous polyurethane dispersions, as mentioned above, it remains an advantage to carry out the prepolymer mixing process in the presence of organic solvents or non-reactive diluents with the first aim to control the viscosity of the prepolymer. It is known that said organic solvent remains as a co-solvent in the dispersion thereby affecting the final properties of the aqueous polyurethane dispersions and articles, in particular coated articles made therefrom. Thus, the selection of the organic solvent is steered by the targeted properties of the aqueous polyurethane dispersions and articles made therefrom and by environmental legislation.

Therefore, there is still a need for environmentally friendly organic solvents especially suitable for use in polyurethane (PU) systems having an improved versatility, whereby said organic solvents can serve multiple purposes at the same time, in particular (1) acting as a prepolymer diluent in aqueous polyurethane dispersions (i.e. controlling the viscosity of the prepolymer), (2) acting as a dispersing agent (i.e. providing an improved stability of the PUD) and (3) acting as a coalescing agent thereby aiding in the formation of smooth, uniform films and coatings. There is thus an ongoing need for improved aqueous polyurethane dispersions comprising said organic solvents, present in minimal amounts which can provide products that are both chemically and colloidally stable, containing minimal amounts of internal and/or external water dispersible entities, that do not emit VOC, particularly PUDs having an improved ability to coalesce to films or coatings whereby said films and coatings obtained have improved mechanical properties, in particular tensile strength and elongation, better tear resistance and improved water resistance, and improved chemical resistance properties.

SUMMARY OF THE INVENTION

The inventors have now found surprisingly that it is possible to provide an aqueous polyurethane dispersion fulfilling the above mentioned needs.

It is thus an object of the present invention to provide an aqueous polyurethane dispersion comprising:
A. at least one isocyanate terminated polyurethane prepolymer [prepolymer (P), herein after] prepared by reacting in the presence of at least one pyrrolidone [(b-pyrrolidone, herein after] selected from the group consisting of N-n-butylpyrrolidone, N-isobutylpyrrolidone, N-sec-butylpyrrolidone and N-tert-butylpyrrolidone, a mixture (M) which comprises:
  (a) at least one polyisocyanate compound (a),
  (b) at least one polyol compound (b), having a molecular weight $M_w$ of 200 to 8000 and a hydroxyl functionality of 1.5 to 6,
  (c) at least one water dispersible enhancing component having at least one hydrophilic group or potentially hydrophilic group [component ($WD_H$), herein after] and comprising:
    i. x mmol/kg of at least one water dispersible enhancing compound having at least one anionic hydrophilic group or potentially anionic hydrophilic group [compound ($WD_{HA}$), herein after], and/or
    ii. y mmol/kg of at least one water dispersible enhancing compound having at least one non-ionic hydrophilic group or potentially non-ionic hydrophilic group [compound ($WD_{HN}$) herein after], and/or
    iii. z mmol/kg of at least one water dispersible enhancing compound having at least one cationic hydrophilic group or potentially cationic hydrophilic group [compound ($WD_{HC}$), herein after],
    iv. w mmol/kg of at least one water dispersible enhancing compound having at least one zwitterionic hydrophilic group or potentially zwitterionic hydrophilic group [compound ($WD_{HZ}$), herein after],
    wherein $$\frac{200x + 70y + 72z + 75w}{x + y + z + w} < x + y + z + w < \frac{560x + 248y + 165z + 300w}{x + y + z + w}$$

and at least one of x, y, z or w is different from 0 and all mmol/kg are based on the weight of all the components initially present in the mixture (M),
B. optionally, at least one isocyanate-reactive compound [compound (I)] herein after], different from the polyol compound (b) and different from the component ($WD_H$), having reactive groups chosen among alcoholic hydroxyl groups or primary or secondary amino groups; and
C. water.

It is a further object of the present invention to provide a method of producing said aqueous polyurethane dispersion.

It is also a further object of the present invention to provide films or coatings obtained from said aqueous polyurethane dispersion.

It is also a further object of the present invention to provide a number of uses of the b-pyrrolidone.

The aqueous polyurethane dispersion

Within the context of the present invention, the expression "at least one pyrrolidone (b-pyrrolidone, herein after]" is intended to denote one or more than one b-pyrrolidone.

As said, the prepolymer (P) in the aqueous polyurethane dispersion of the present invention is prepared by reacting a mixture (M) in the presence of at least one b-pyrrolidone. Most preferred b-pyrrolidone is N-n-butylpyrrolidone.

The b-pyrrolidone of the present invention, as detailed above, is known for its use as a non-reprotoxic solvent as notably described in WO 2013/107822, the whole content of which is herein incorporated by reference.

The inventors have now found that the b-pyrrolidone of the present invention, in particular N-n-butylpyrrolidone, brings the significant advantage of a dramatically reduced toxicity of the aqueous polyurethane dispersion according to the invention, and thus also of the derived polyurethane films or coatings.

WO 2005/090430 A1 and DE 10 2007 028890 A1 describe the use of N-(cyclo)-alkylpyrrolidones with (cyclo) alkyl radicals having 2 to 6 C atoms, in particular N-ethylpyrrolidone (NEP), as solvents in processes for preparing polyurethane dispersions. However, according to Annex VI of CLP [i.e. the Regulation on classification, labelling and packaging of substances and mixtures. This Regulation aligns previous EU legislation on classification, labelling and packaging of chemicals to the GHS (Globally Harmonised System of Classification and Labelling of Chemicals)], NEP is also classified as reprotoxic.

WO 2005/090430 A1 and DE 10 2007 028890 A1 state that the use of N-(cyclo)-alkylpyrrolidones with (cyclo)alkyl radicals having 2 to 6 C atoms, in particular N-ethylpyrrolidone (NEP), has a beneficial effect on the properties of the resultant polyurethane dispersion. However, these documents do not disclose any experimental results demonstrating that the alleged beneficial effect was actually obtained. On the contrary, NEP for example does not allow the formation of a true non-ionic polyurethane dispersion system but forms instead a coagulated gel, as illustrated in the exemplified section below. Further, WO 2005/090430 A1 and DE 10 2007 028890 A1 remain completely silent about the multipurpose functions of N-(cyclo)alkylpyrrolidones with (cyclo)alkyl radicals having 2 to 6 C atoms, being a diluent, a dispersing agent and a coalescing agent for PU systems.

The inventors have now surprisingly found that the specific selection of the b-pyrrolidone, as detailed above, brings the advantage that said b-pyrrolidone may serve multiple functions and provides at the same time (1) an improved viscosity control in the prepolymer (P), as detailed above (2) an improved dispersion ability of the aqueous polyurethane dispersion and (3) an improved ability of the aqueous polyurethane dispersion to coalesce to a film or a coating.

In a preferred embodiment of the present invention, the weight percent of the b-pyrrolidone, as detailed above, relative to the total weight of all the components initially present in the mixture (M) and the b-pyrrolidone is generally less than 50 wt. %, preferably less than 40 wt. %, more preferably less than 30 wt. %, even more preferably less than 25 wt. %.

It is further understood that the weight percent of the b-pyrrolidone, relative to the total weight of all the components initially present in the mixture (M) and the b-pyrrolidone is generally greater than 1 wt. %, preferably greater than 4 wt. %, more preferably greater than 6 wt. %, even more preferably greater than 8 wt. %.

Good results were obtained when the weight percent of the b-pyrrolidone, relative to the total weight of all the components initially present in the mixture (M) and the b-pyrrolidone is between 8 wt. %-25 wt. %.

The b-pyrrolidone, as detailed above, is generally mixed into the mixture (M) of the present invention and is carried through to the water phase as part of the aqueous polyurethane dispersion.

Advantageously, the weight percent of the b-pyrrolidone, relative to the total weight of the aqueous polyurethane dispersion is less than 20 wt. %, preferably less than 12 wt. %, more preferably less than 8 wt. %.

Thus, the inventors have surprisingly found that the b-pyrrolidone of the present invention can be used as a good diluent to render the viscosity of mixture (M), as detailed above, low enough to achieve excellent processing properties in the manufacturing of the prepolymer (P) while improving at the same time the toxicological properties of the prepolymer (P) and the final aqueous polyurethane dispersion.

According to certain embodiments of the present invention, the prepolymer (P) is prepared by reacting the mixture (M), as detailed above, in the sole presence of the b-pyrrolidone as organic solvent. This being said, the mixture (M) is thus substantially free of any additional organic solvent.

For the purpose of the present invention, the term "additional solvent" is understood to denote any solvent different from the b-pyrrolidone and different from the ingredients of the mixture (M).

For the purpose of the present invention, the expression "substantially free of any additional organic solvent" means that the additional organic solvent content, relative to the total weight of all the components initially present in the mixture (M), is less than 0.01 wt. %, in particular less than 0.005 wt. %, specifically less than 0.001 wt. %, more specifically less than 0.0005 wt. %, even more specifically less than 0.0001 wt. %.

According to other embodiments of the present invention, the the b-pyrrolidone is used together with an additional solvent in the manufacturing of the prepolymer (P) wherein said additional solvent is present in an amount of at most 20% by weight, preferably of at most 15% by weight and more preferably of at most 10% by weight, relative to the total weight of the b-pyrrolidone.

Non-limiting examples of suitable additional solvents may include, but are not limited to, acetone, methyl ethyl ketone, propylene glycol, ethylene glycol monobutyl ether, diethylene glycol monobutyl ether, propylene glycol butyl ether, dipropylene glycol butyl ether, dipropylene glycol methyl ether, propylene glycol methyl ether and propylene glycol methyl ether acetate.

As said, the mixture (M) of the present invention comprises at least one polyisocyanate compound (a).

Within the context of the present invention the expression "at least one polyisocyanate compound (a)" is intended to denote one or more than one polyisocyanate compound (a).

For the purpose of the present invention, the expression "polyisocyanate compound (a)" refers to any polyisocyanate commonly used in the manufacturing of aqueous polyurethane dispersions.

Said polyisocyanate compound (a) may include notably aliphatic, cycloaliphatic, araliphatic and aromatic diisocyanates and polyisocyanates. Cycloaliphatic diisocyanates are in particular preferred.

Non-limiting examples of suitable aliphatic diisocyanates may include, but not limited to, tetramethylene diisocyanate, hexamethylene diisocyanate (1,6-diisocyanatohexane); octamethylene diisocyanate; decamethylene diisocyanate; dodecamethylene diisocyanate; tetradecamethylene diisocyanate; trimethylhexane diisocyanate; tetramethylhexane diisocyanate and mixtures thereof.

Preferred aliphatic diisocyanates include trimethylhexane diisocyanate and hexamethylene diisocyanate.

Non-limiting examples of suitable cycloaliphatic diisocyanates may include, but not limited to, isophorone diisocyanate (IPDI); 4,4'-methylenebis(cyclohexyl isocyanate) (H12MDI); 1,4-, 1,3- or 1,2-diisocyanatocyclohexane; 2,2-bis(4-isocyanatocyclohexyl)propane; 1,3-bis(isocyanatomethyl)cyclohexane; 2,4-diisocyanato-1-methylcyclohexane; 2,6-diisocyanato-1-methylcyclohexane and mixtures thereof.

Preferred cycloaliphatic diisocyanates include isophorone diisocyanate (IPDI); 4,4'-methylenebis(cyclohexyl isocyanate) (H12MDI); IPDI and H12MDI are particularly preferred.

Non-limiting examples of suitable araliphatic diisocyanates may include, but not limited to, m-tetramethyl xylylene diisocyanate (m-TMXDI); p-tetramethyl xylylene diisocyanate; and mixtures thereof.

A preferred araliphatic diisocyanate is notably m-tetramethyl xylylene diisocyanate (m-TMXDI).

Non-limiting examples of suitable aromatic diisocyanates may include, but not limited to, 2,4- and 2,6-tolylene diisocyanate and the isomer mixtures thereof; m- or p-xylylene diisocyanate; 2,4'-diisocyanatodiphenylmethane and 4,4'-diisocyanatodiphenylmethane (MDI, 4,4'-methylene diphenyl diisocyanate) and the isomer mixtures thereof; 1,3- and 1,4-phenylene diisocyanate; 1,5-naphthylene diisocyanate; diphenylene 4,4'-diisocyanate; 1,4-diisocyanatobenzene; diphenyl ether 4,4'-diisocyanate; 4,4'-diisocyanato-3,3'-dimethylbiphenyl, 3-methyldiphenylmethane 4,4'-diisocyanate and mixtures thereof.

Preferred aromatic diisocyanates include 2,4- and 2,6-tolylene diisocyanate and 2,4'-diisocyanatodiphenylmethane and 4,4'-diisocyanatodiphenylmethane (MDI, 4,4'-methylene diphenyl diisocyanate)

Non-limiting examples of suitable polyisocyanates may include, but not limited to, polyphenyl polymethylene polyisocyanates (PMDI, polymeric MDI) and polyether modified PMDI; mixtures of PMDI and toluene diisocyanates; modified multifunctional isocyanates, such as notably polyisocyanates containing esters, ureas, biurets, allophanates, carbodiimides and/or uretonimines.

As said, the mixture (M) of the present invention comprises at least one polyol compound (b) having a molecular weight $M_w$ of 200 to 8000 g/mol and a hydroxyl functionality of 1.5 to 6.

Within the context of the present invention the expression "at least one polyol compound (b) having a molecular weight $M_w$ of 200 to 8000 g/mol and a hydroxyl functionality of 1.5 to 6" is intended to denote one or more than one polyol compound (b) having a molecular weight $M_w$ of 200 to 8000 g/mol and a hydroxyl functionality of 1.5 to 6.

The polyol compound (b) has preferably a molecular weight $M_w$ of 400 to 6000 g/mol, more preferably 400 to 4000 g/mol and even more preferably 400 to 3500 g/mol.

The polyol compound (b) has preferably a hydroxyl functionality of 1.5 to 3.5 and more preferably a hydroxyl functionality of 1.9 to 2.1.

Non-limiting examples of the polyol compound (b) that can suitably be used for the preparation of the prepolymer (P) of the present invention may include for example conventional polyester polyols, polyacrylate polyols, polyurethane polyols, polycaprolactone polyols, polycarbonate polyols, polyether polyols, polyester polyacrylate polyols and polyurethane polyacrylate polyols, polyurethane polyester polyols, polyurethane polyether polyols, polyurethane polycarbonate polyols, polyester polycarbonate polyols, and mixture thereof.

Among polyether polyols mention may be made of the polyaddition products of styrene oxide, ethylene oxide, propylene oxide, tetrahydrofuran, butylene oxide, epichlorohydrin, and the co-addition and graft products thereof, as well as the polyether polyols obtained by condensation of polyhydric alcohols or mixtures thereof and by alkoxylation of polyhydric alcohols, amines and amino alcohols.

Polyether polyols based on propylene oxide and optionally ethylene oxide with a molecular weight between 200 and 6000, an average hydroxyl functionally between 1.5 and 3.5 preferably between 1.9 and 2.1 and an oxypropylene content between 10 and 100% more preferably between 75 and 100% are examples of suitable polyol compounds (b). The production of these polyols and the way to control their average equivalent weights and functionalities is well known in the art.

Among polyester polyols mention may be made of polycondensates of polyhydric alcohols and polycarboxylic acids, also including the natural oil based polyester polyols such as notably castor oil. Instead of the free polycarboxylic acids it is also possible to use the corresponding polycarboxylic anhydrides or corresponding polycarboxylic esters of lower alcohols, or mixtures thereof, to prepare the polyester polyols. The polycarboxylic acids can be aliphatic, cycloaliphatic, araliphatic, aromatic or heterocyclic and can be optionally substituted, by halogen atoms, for example, and/or unsaturated. Examples are suberic, azelaic, phthalic, and isophthalic acid, phthalic, tetrahydrophthalic, hexahydrophthalic, tetrachlorophthalic, endomethylenetetrahydrophthalic, glutaric and maleic anhydride, maleic acid, fumaric acid, dimeric fatty acids and fatty acids. Preference is given to dicarboxylic acids of the general formula HOOC—(CH$_2$)$_y$—COOH, where y is a number from 1 to 20, preferably an even number from 2 to 20, examples being succinic, adipic, sebacic and dodecane-dicarboxylic acids.

Examples of suitable polyhydric alcohols are ethylene glycol, bis(hydroxymethyl)cyclohexanes, 1,2-propanediol, 1,3-propanediol, 1,3-butanediol, 1,4-butenediol, 1,4-butynediol, 1,5-pentanediol, neopentyl glycol, 2-methyl-1,3-propanediol and also diethylene glycol, triethylene glycol, tetraethylene glycol, polyethylene glycol, dipropylene glycol, polypropylene glycol, dibutylene glycol and polybutylene glycols. Preference is given to alcohols of the general formula HO—(CH$_2$)$_x$—OH, where x is a number from 1 to 20, preferably an even number from 2 to 20. Examples of such alcohols are ethylene glycol, 1,4-butanediol, 1,6-hexanediol, 1,8-octanediol and 1,12-dodecanediol.

The commercially available Piothane® polyester polyols from Pioneer Resins are typical examples of polyester polyols suitable for the invention.

Among polycarbonate polyols mention may be made of reaction products of carbonic acid derivatives, for example diphenyl carbonate, dimethyl carbonate or phosgene, with diols. Examples of such diols are ethylene glycol, 1,2- and 1,3-propanediol, 1,3- and 1,4-butane diol, 1,6-hexanediol, 1,8-octanediol, neopentyl glycol, 1,4-bis(hydroxymethyl) cyclohexane, 2-methyl-1,3-propanediol, 2,2,4-trimethylpentanediol, 1,3-dipropylene glycol, polypropylene glycols, dibutylene glycol, polybutylene glycols, bisphenol A, tetrabromobisphenol A but also lactone-modified diols such as notably ε-caprolactone.

Mention may also be made of reaction products of caprolactone copolymers with polylactide, polyether, polyester, hydrophilic glycol and polycarbonate.

The commercially available Capa™ Polyols from Perstorp are typical examples of polycaprolactone polyols and polycaprolactone polycarbonate copolymer diols suitable for the invention. In particular, the commercially available CAPA™7203 polycaprolactone/polycarbonate copolymer ester is a suitable polyester polyol.

The inventors have found that the use of the b-pyrrolidone, in particular N-n-butylpyrrolidone, which also acts as a good dispersing agent, enables significant reduction of the content of water dispersible entities (i.e. component c) in mixture (M)) in the preparation of the prepolymer (P) of the present invention.

This being said, due to the presence of the b-pyrrolidone in the mixture (M) for the preparation of the prepolymer (P) comprised in the aqueous polyurethane dispersion of the present invention, the at least one water dispersible enhancing component having at least one hydrophilic group or potentially hydrophilic group [component (WD$_H$), herein after] is comprising:

i. x mmol/kg of at least one water dispersible enhancing compound having at least one anionic hydrophilic group or potentially anionic hydrophilic group [compound (WD$_{HA}$), herein after], and/or ii. y mmol/kg of at least one water dispersible enhancing compound having at least one non-ionic hydrophilic group or potentially non-ionic hydrophilic group [compound (WD$_{HN}$) herein after], and/or iii. z mmol/kg of at least one water dispersible enhancing compound having at least one cationic hydrophilic group or potentially cationic hydrophilic group [compound (WD$_{HC}$), herein after], iv. w mmol/kg of at least one water dispersible enhancing compound having at least one zwitterionic hydrophilic group or potentially zwitterionic hydrophilic group [compound (WD$_{HZ}$), herein after], wherein $$\frac{200x + 70y + 72z + 75w}{x+y+z+w} < x+y+z+w < \frac{560x + 248y + 165z + 300w}{x+y+z+w}$$

preferably $$\frac{240x + 90y + 85z + 110w}{x+y+z+w} < x+y+z+w < \frac{400x + 200y + 150z + 250w}{x+y+z+w}$$

and at least one of x, y, z or w is different from 0 and all mmol/kg are based on the weight of all the components initially present in the mixture (M).

Within the context of the present invention the expression "at least one water dispersible enhancing component having at least one hydrophilic group or potentially hydrophilic group [component (WD$_H$), herein after]" is intended to denote one or more than one component (WD$_H$). It is understood that the same applies for the expressions "compound (WD$_{HA}$)", "compound (WD$_{HN}$)", "compound (WD$_{HC}$)" and compound (WD$_{HZ}$).

It is also further understood that for the purposes of the present invention a potentially hydrophilic group refers to a group which can be converted into a hydrophilic group. In particular, the potentially anionic and cationic hydrophilic groups are groups that can, if desired, be converted to anionic and cationic hydrophilic groups, respectively, upon neutralizing with a neutralizing agent, as will be discussed in detail below.

The hydrophilic groups or the potentially hydrophilic groups of the component (WD$_H$) react with the polyisocyanate compound (a) much more slowly than do the functional groups (FG groups) of the component (WD$_H$) that are used to build up the polymer backbone chain of the prepolymer (P).

Suitable compounds (WD$_{HA}$) may be selected from compounds having the general formula (HA):

  formula (HA)

wherein FG is at least one functional group, wherein said functional group is preferably selected from the group consisting of —OH, —SH, —NH$_2$ or —NHR$^2$, wherein R$^2$ is an alkyl or aryl group, preferably R$^2$ is selected from the group consisting of methyl, ethyl, isopropyl, n-propyl, n-butyl, isobutyl, sec-butyl, tert-butyl, cyclopentyl or cyclohexyl, R$^1$ is an aliphatic, cycloaliphatic or aromatic radical containing 1 to 20 carbon atoms, and AG is at least one anionic or potential anionic group wherein said anionic or potential anionic group is selected from the group consisting of —COOY, —SO$_3$Y and —PO(OY)$_2$ wherein each of Y, equal to or different from each other, is selected from the group consisting of hydrogen, ammonium salt, alkali metal, alkaline earth metal.

Typical compounds (WD$_{HA}$) having the general formula (HA), as defined above, notably include mercaptoacetic acid, mercaptopropionic acid, thiolactic acid, mercaptosuccinic acid, glycine, iminodiacetic acid, sarcosine, alanine, β-alanine, leucine, isoleucine, aminobutyric acid, hydroxyacetic acid, hydroxypivalic acid, lactic acid, hydroxysuccinic acid, hydroxydecanoic acid, dimethylolpropionic acid, hydroxydodecanoic acid, dimethylolbutyric acid, 12-hydroxystearic acid, ethylenediaminetriacetic acid, hydroxyhexadecanoic acid, aminonaphthalenecarboxylic acid, hydroxyethanesulfonic acid, taurine, mercaptopropanesulfonic acid, hydroxypropanesulfonic acid, mercaptoethanesulfonic acid, aminomethanesulfonic acid, aminopropanesulfonic acid and also the alkali metal, alkaline earth metal or ammonium salts thereof.

Preferred compounds (WD$_{HA}$) are selected from those having the formulae (HA-1) to (HA-6):

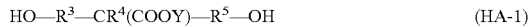  (HA-1)

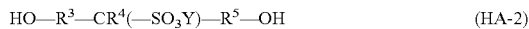  (HA-2)

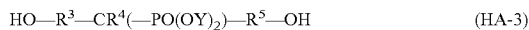  (HA-3)

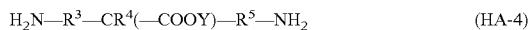  (HA-4)

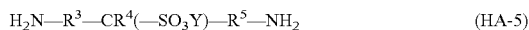  (HA-5)

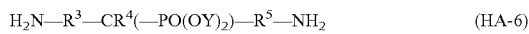  (HA-6)

wherein each of R$^3$ and R$^5$, equal to or different from each other, is a C$_1$- to C$_4$-alkanediyl unit, each of R$^4$, equal to or different from each other, is a C$_1$- to C$_4$-alkyl unit and Y has the same meaning as defined above.

More preferred compounds (WD$_{HA}$) are those having the formulae (HA-1), as specified above, wherein Y is an hydrogen.

Even more preferred compounds (WD$_{HA}$) are dimethylolbutyric acid (DMBA) and dimethylolpropionic acid (DMPA).

Most preferred compound (WD$_{HA}$) is dimethylolpropionic acid (DMPA).

Suitable compounds (WD$_{HN}$) may be selected from compounds having the general formula (HN):

  formula (HN)

wherein FG is at least one functional group, wherein said functional group is preferably selected from the group consisting of —OH, —SH, —NH$_2$ or —NHR$^2$, wherein R$^2$ is an alkyl or aryl group, preferably R$^2$ is selected from the group consisting of methyl, ethyl, isopropyl, n-propyl, n-butyl, isobutyl, sec-butyl, tert-butyl, cyclopentyl or cyclohexyl, R$^1$ is an aliphatic, cycloaliphatic or aromatic radical containing 1 to 20 carbon atoms, X is a polyalkylene oxide chain having 5 to 100, preferably 10 to 80 repeating alkylene oxide units, which may be composed to an extent of at least 40%, preferably at least 65%, of repeating ethylene oxide units and which in addition to said repeating ethylene oxide units may be composed of propylene oxide, butylene oxide or styrene oxide units, Z is oxygen or —NR$^6$—, wherein R$^6$ is H, an alkyl or aryl group, preferably R$^6$ is selected from the group consisting of methyl, ethyl, isopropyl, n-propyl, n-butyl, isobutyl, sec-butyl, tert-butyl, cyclopentyl or cyclohexyl and R' is a monovalent hydrocarbon radical having 1 to 12 carbon atoms, preferably an unsubstituted alkyl radical having 1 to 4 carbon atoms.

Typical compounds (WD$_{HN}$) having the general formula (HN), as defined above, are notably described in U.S. Pat. Nos. 3,905,929 and 3,920,598, the entire content of which are herein incorporated by reference.

Preferred compounds (WD$_{HN}$) are having the general formula (HN-1), as defined below,

  formula (HN-1)

wherein R$^7$ is trivalent hydrocarbon radical having 3 to 12 carbon atoms, X and R' have the same meaning as defined above.

Even more preferred compounds (WD$_{HN}$) are having the general formula (HN-1'):

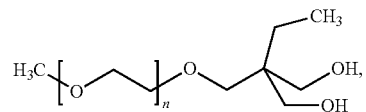

wherein n is an integer of 10 to 25, preferably n is an integer of 16 to 22.

Suitable compounds (WD$_{HC}$) may be selected from compounds having at least one tertiary amino group or at least one quaternary amino group.

Non-limiting examples of suitable compounds (WD$_{HC}$) may include, but are not limited to, tris(hydroxyalkyl) amines, N,N'-bis(hydroxyalkyl)alkylamines, N-hydroxyalkyl-dialkylamines, tris(aminoalkyl)amines, N,N'-bis(aminoalkyl)alkylamines and N-aminoalkyl-dialkylamines, wherein each of said alkyl radical or divalent alkyl radical, equal to or different from each other, is consisting of 2 to 6 carbons. Polyethers containing tertiary nitrogen atoms and preferably two terminal hydroxyl groups, such as are obtainable in conventional manner by, for example, alkoxylating amines having two hydrogen atoms attached to amine nitrogen, examples being methylamine, aniline and N,N'-dimethylhydrazine may also suitably be used as compounds (WD$_{HC}$). Said polyethers generally have a molar weight of between 500 and 6000 g/mol.

For the purpose of the present invention, the term "water dispersible enhancing compound having at least one zwitterionic hydrophilic group" refers to compounds having both at least one anionic and at least one cationic group within the same molecule. It is known that this occurs at a certain pH range, for example between 3 and 10.

It is also further understood that for the purposes of the present invention a potentially zwitterionic hydrophilic group refers to a group which can be converted into a zwitterionic hydrophilic group by subjecting the potentially zwitterionic hydrophilic group to the appropriate pH range.

Suitable compounds (WD$_{HZ}$) may be selected from compounds having both i) a cationic group selected from the group consisting of a quaternary ammonium, a phosphonium, a sulfonium and ii) an anionic group selected from a carboxylate, a sulfonate, a sulfate, a phosphate, and an oxide.

In particular, compounds (WD$_{HZ}$) may be selected among betains, preferably carboxy-betaines, sulfo-betaines, phospho-betaines and thetins.

Carboxy-betaines, sulfo-betaines, phospho-betaines are notably described in U.S. Patent application 2014/0248232 the whole content is herein incorporated by reference.

For the purpose of the present invention, betaines refers to zwitterions having a positively charged nitrogen atom, and thetins refers to zwitterions having a positively charged sulfur atom.

β-alanine betaine, N-butyldiethanolamine betaine are typical examples of carboxy-betaines.

N-butyldiethanolamine sulfopropyl betaine is a typical example of a sulfo-betaine.

Non-limiting examples of suitable thetins are notably described in U.S. Pat. No. 3,573,049 the whole content is herein incorporated by reference.

According to certain preferred embodiments of the present invention, the component (WD$_H$) present in the mixture (M) comprises, consists essentially of:
i. x mmol/kg of the compound (WD$_{HA}$), and/or
ii. y mmol/kg of the compound (WD$_{HN}$)
wherein $$\frac{200x+70y}{x+y} < x+y < \frac{560x+248y}{x+y}$$

preferably, $$\frac{240x+90y}{x+y} < x+y < \frac{400x+200y}{x+y}$$

and more preferably, $$\frac{240x+90y}{x+y} < x+y < \frac{350x+150y}{x+y}$$

and at least one of x or y is different from 0 and all mmol/kg are based on the weight of all the components initially present in the mixture (M).

For the purpose of the present invention, the expression "consists essentially of" is intended to denote that any additional compound different from the compound (WD$_{HA}$), as detailed above, and the compound (WD$_{HN}$), as detailed above, is present in an amount of at most 1% by weight, based on the total weight of the component (WD$_H$).

According to one particular embodiment of the present invention, the component (WD$_H$) present in the mixture (M) comprises, preferably consists of, compound (WD$_{HA}$), as detailed above, and is present in a molar amount, based on the weight of all the components initially present in the mixture (M), of 200 to 560 mmol/kg, preferably 240 to 400 mmol/kg, more preferably 240 to 350 mmol/kg.

According to another particular embodiment of the present invention, the component (WD$_H$) present in the mixture (M) comprises, preferably consists of, compound (WD$_{HN}$), as detailed above, and is present in a molar amount, based on the weight of all the components initially present in the mixture (M), of 70 to 248 mmol/kg, preferably 90 to 200 mmol/kg, and more preferably 90 to 150 mmol/kg.

According to another particular embodiment of the present invention, the component (WD$_H$) present in the mixture (M) comprises, preferably consists of, compound (WD$_{HC}$), as detailed above, and is present in a molar amount, based on the weight of all the components initially present in the mixture (M), of 72 to 165 mmol/kg, preferably 85 to 150 mmol/kg, and more preferably 95 to 150 mmol/kg.

According to another particular embodiment of the present invention, the component (WD$_H$) present in the mixture (M) comprises, preferably consists of, compound (WD$_{HZ}$), as detailed above, and is present in a molar amount, based on the weight of all the components initially present in the mixture (M), of 75 to 300 mmol/kg, preferably 110 to 250 mmol/kg, and more preferably 110 to 150 mmol/kg.

As mentioned above, the anionic and cationic hydrophilic groups can be formed by neutralizing the corresponding potential anionic and cationic hydrophilic groups with at least one neutralizing agent.

Within the context of this invention, the term "neutralizing agents" is intended to denote all types of agents which are useful for converting said potential anionic and cationic hydrophilic groups to the corresponding anionic and cationic hydrophilic groups.

Non-limiting examples of neutralizing agents suitable for converting the potential anionic hydrophilic group into the corresponding anionic hydrophilic group, in particular neutralizing acid groups such as carboxylic acid and sulfonic acid groups, include inorganic alkali metals bases such as potassium hydroxide, sodium hydroxide, and lithium hydroxide; ammonia, primary amines, secondary amines, or tertiary amines. Tertiary amines are especially preferred.

Suitable neutralizing agents having basic tertiary amino groups are notably described in patent application US 2011/0306724 A1, the whole content is herein incorporated by reference.

Among tertiary amines suitable to use as neutralizing agents mention can be made of triethylamine, trimethylamine, triisopropylamine, tributylamine, N,N-dimethyl-cyclohexylamine, N,N-dimethyl-ethanolamine, N,N-diethyl-ethanolamine, triethanolamine, N-methyl-diethanolamine, dimethylaminopropanol, and 2-(methoxyethyl)dimethylamine. Triethylamine and N,N-dimethyl-ethanolamine are in particular preferred.

Non-limiting examples of neutralizing agents suitable for converting the potential cationic hydrophilic group into the corresponding cationic hydrophilic group, in particular neutralizing the tertiary amino group, include inorganic acids such as notably phosphoric acid, sulfuric acid, hydrohalic acids (e.g. hydrochloric acid) or nitric acid; organic acids, such as notably formic acid, acetic acid or lactic acid, or by reaction with appropriate quaternizing agents such as notably $C_1$ to $C_6$ alkyl halides into the ammonium salts.

Said neutralization or quaternization may be conducted before, during or after the preparation of the prepolymer (P), as detailed above. When added after the preparation of the prepolymer (P), the neutralizing agent may be added directly after the formation of the prepolymer (P) but prior to dispersing said prepolymer (P) in water or after dispersing said prepolymer (P) in water, thus during the production of polyurethane dispersion.

Conducting the neutralization step after the formation of the prepolymer (P), but prior to dispersing said prepolymer (P) in water advantageously provide a better dispersiblity of the prepolymer (P) in water compared to adding the neutralizing agent to the water in the dispersing step.

The stoichiometry of the mixture (M) of the present invention is such that the polyisocyanate compound (a) is present in excess.

According to a preferred embodiment of the present invention, the molar amount of the polyisocyanate compound (a) is chosen such that the molar amount of the isocyanate groups (NCO groups) of the polyisocyanate compound (a) relative to the molar amount of the isocyanate reactive groups of all the compounds initially present in the mixture (M) is from 1.05 to 3, preferably from 1.3 to 2.5, more preferably from 1.5 to 2.0.

It is further understood that the isocyanate reactive groups include the functional groups (FG) of the component $(WD_H)$, as mentioned above, being different from the hydrophilic groups or the potentially hydrophilic groups of the component $(WD_H)$, which are able to react with the isocyanate groups of the polyisocyanate compound (a).

In an advantageous embodiment of the present invention, the prepolymer (P) prepared by reacting the mixture (M) in the presence of the b-pyrrolidone, comprises unreacted NCO groups in an amount of at most 15% by weight (% wt.), preferably at most 10% wt., more preferably at most 8% wt., relative to total weight of the prepolymer (P).

As said, the aqueous polyurethane dispersion of the present invention may optionally further comprise at least one isocyanate-reactive compound [compound (I)] herein after], different from the polyol compound (b) and different from the component $(WD_H)$, having reactive groups chosen among alcoholic hydroxyl groups or primary or secondary amino groups.

When present, compound (I) may be added before, during (e.g. as a compound of mixture (M)) or after the preparation of the prepolymer (P) of the present invention.

In one embodiment of the present invention, the compound (I) is immediately added after the preparation of the prepolymer (P) thereby forming a polyurethane polymer [polymer (PU), herein after] wherein said polymer (PU) is dispersed in water.

In a preferred embodiment of the present invention, the compound (I) is added after dispersing the prepolymer (P), as mentioned above, in water. Thus, the compound (I) is added during the production of the aqueous polyurethane dispersion.

Within the context of the present invention the mention "at least one isocyanate-reactive compound [compound (I)] herein after]" is intended to denote one or more than one component (I).

Said compound (I) can be used for crosslinking or chain extension of the prepolymer (P), as detailed above.

Any chain extender and/or crosslinking agent, different from the polyol compound (b) and the component $(WD_H)$, known to the skilled person in the art for the manufacturing of polyurethanes can be used in this invention.

According to an advantageous embodiment of the present invention, the aqueous polyurethane dispersion comprises the compound (I) in a molar amount of at most 10%, preferably at most 8%, more preferably of at most 5%, relative to the total molar amount of the polyol compound (b) and the component $(WD_H)$.

According to a preferred embodiment of the present invention, the aqueous polyurethane dispersion comprises the compound (I), when added after the preparation of the prepolymer (P), in a molar amount which is chosen as such that the molar amount of the isocyanate reactive groups in the compound (I) relative to the molar amount of the unreacted NCO groups in the prepolymer (P) is from 3:1 to 1:3, preferably 2:1 to 1:2, more preferably 1.5:1 to 1:1.5.

In general, compound (I) is selected from the group consisting of diols having a molecular weight $M_w$ of 60 to 200 g/mol, polyfunctional alcohols, amines having at least 2 primary and/or secondary amino groups, mono-alcohols having at least 1 primary and/or secondary amino groups.

Among diols having a molecular weight $M_w$ of 60 to 200 g/mol mention can notably be made of 1,4-butanediol, 1,3-butanediol, hexanediol, methyl propanediol, butylethyl propane diol, hydroquinone bis(2-hydroxyethyl)ether, 2,2'-(phenylimino)diethanol, and diethanol-para-toluidinepentaerythritol.

Among polyfunctional alcohols mention can notably be made of trimethylolbutane, trimethylolpropane, trimethylolethane, ethylene glycol, diethylene glycol, propylene glycol, glycerol, sugar alcohols, such as sorbitol, mannitol, diglycerol, threitol, erythritol, adonitol (ribitol), arabitol (lyxitol), xylitol, dulcitol (galactitol), maltitol or isomalt.

Among amines having at least 2 primary and/or secondary amino groups mention can notably be made of diamines such as ethylenediamines, propylenediamines, butylenediamines, diaminohexanes, piperazine, 2,5-dimethylpiperazine, hydrazine, hydrazine hydrate, amino-3-aminomethyl-3,5,5-trimethylcyclohexane (isophoronediamine, IPDA), 4,4'-diaminodicyclohexylmethane, aminoethylethanolamine, 1,4-diamino-cyclohexane; triamines such as diethylenetriamine or 1,8-diamino-4-aminomethyloctane; higher amines such as triethylenetetramine, tetraethylenepentamine; polymeric amines such as polyethylenamines. Diamines, in particular ethylenediamine, hydrazine or hydrazine hydrate (i.e. 64% hydrazine concentration in water) and triamines, in particular diethylenetriamine, and mixture thereof are especially preferred.

In general, amines having at least 2 primary and/or secondary amino groups react more quickly with isocyanates than do alcohols or water. Therefore, the prepolymer (P) is advantageously first dispersed in water and then subjected to chain extension or crosslinking by adding said amines. Said amines are advantageously mixed with water.

Among mono-alcohols having at least 1 primary and/or secondary amino groups mention may be made of mono-ethanolamine and amino methyl propanol.

According to certain embodiments of the present invention, the aqueous polyurethane dispersion can further comprise at least one isocyanate monofunctional reactive compound.

Non-limiting examples of suitable isocyanate monofunctional reactive compound may include methanol, ethanol, isopropanol, n-propanol, n-butanol, isobutanol, sec-butanol, tert-butanol, ethylene glycol monomethyl ether, ethylene glycol monoethyl ether, 1,3-propanediol monomethyl ether, n-hexanol, n-heptanol, n-octanol, n-decanol, n-dodecanol (lauryl alcohol) and 2-ethylhexanol.

When present, the isocyanate monofunctional reactive compound may be added before, during or after the preparation of the prepolymer (P), as detailed above. When added after the preparation of the prepolymer (P), the isocyanate monofunctional reactive compound may be added directly after the formation of the prepolymer (P) but prior to dispersing said prepolymer (P) in water or after dispersing said prepolymer (P) in water, thus during the production of the aqueous polyurethane dispersion.

When present, the isocyanate monofunctional reactive compound is present in a molar amount of at most 1%, preferably at most 0.5%, more preferably of at most 0.02%, relative to the molar amount of the isocyanate groups (NCO groups) of the polyisocyanate compound (a) initially present in the mixture (M).

According to certain embodiments of the present invention, the aqueous polyurethane dispersion further comprises other ingredients such as inorganic and organic pigments, dyes, leveling agents, viscosity regulators, natural and synthetic waxes, color transfer inhibitors, anti-foaming agents, matting agents, surfactants, detergents, optical brighteners, and the like. Said other ingredients are added in small amounts, known to the skilled in the art, to provide specific properties to the aqueous polyurethane dispersion and/or the film and coatings obtained thereof, such as notably mildew resistance, defoaming, defoaming, crosslinking for chemical resistance and heat resistance, flame retardancy, conductivity, light stability, and/or good flow and leveling during application.

The inventors have surprisingly found that the b-pyrrolidone based aqueous polyurethane dispersion of the present invention has good wet dispersion properties such as viscosity, solids content, pH, appearance, heat age stability and is effective in providing smooth films having improved film properties, in particular dry film properties and coatings having improved properties such as increase in surface hardness as measured by Konig hardness, having improved mechanical properties, in particular tensile strength and elongation and/or good water resistance.

In general, the aqueous polyurethane dispersion of the present invention has a total solids content from 10 to 75%, preferably from 20 to 65%, more preferably from 30 to 50% by weight.

It is further understood that the total solids content can be adjusted based on the desired end use, for example the aqueous polyurethane dispersion can be diluted prior to final use.

The aqueous polyurethane dispersion of the present invention has advantageously a Brookfield viscosity less than 7000 mPA-s, preferably less than 4000 mPA-s, more preferably less than 1000 mPA-s, as measured at 25° C., 20 RPM using a Brookfield RV or RVT and a appropriate spindle.

Manufacturing of the Aqueous Polyurethane Dispersion

The aqueous polyurethane dispersion of the present invention can be prepared by a variety of methods known to the skilled person in the art. The manufacturing of the aqueous polyurethane dispersion is also an aspect of the present invention.

In one embodiment of the present invention, a method for the manufacturing of an aqueous polyurethane dispersion comprises the dispersing of the at least one isocyanate terminated polyurethane prepolymer [prepolymer (P)], as defined above, in water.

In a preferred embodiment of the present invention, the prepolymer (P), as defined above, for use in the method for the preparation of the aqueous polyurethane dispersion is neutralized with the neutralizing agent, as detailed above, prior to dispersing in water.

As mentioned above, the compound (I) is preferably added after dispersing the prepolymer (P) in water.

If desired, the prepolymer (P) may first react with the at least one compound (I), as defined above, and/or the isocyanate monofunctional reactive compound thereby forming a polyurethane polymer (polymer (PU)) wherein said polymer (PU) is then dispersed in water.

In another embodiment of the present invention, a method for the manufacturing of an aqueous polyurethane dispersion comprises the dispersing of the polymer (PU), as defined above, in water.

Another aspect of the present invention is a process for the preparation of the prepolymer (P), as defined above, for use in the method for the preparation of the aqueous polyurethane dispersion of the present invention, comprising reacting in the presence of the b-pyrrolidone, as defined above, the mixture (M) which comprises:
- (a) the at least one polyisocyanate compound (a), as defined above,
- (b) the at least one polyol compound (b), having a molecular weight $M_w$ of 200 to 8000 and a hydroxyl functionality of 1.5 to 6, as defined above,
- (c) the at least one component ($WD_H$), as defined above which comprises:
  - i. x mmol/kg of the at least one compound ($WD_{HA}$), as defined above, and/or
  - ii. y mmol/kg of the at least one compound ($WD_{HN}$), as defined above, and/or
  - iii. z mmol/kg of the at least one compound ($WD_{HC}$), as defined above,
  - iv. w mmol/kg of the at least one compound ($WD_{HZ}$), as defined above,
  wherein $$\frac{200x + 70y + 72z + 75w}{x+y+z+w} < x+y+z+w < \frac{560x + 248y + 165z + 300w}{x+y+z+w}$$

and x, y, z or w is different from 0 and all mmol/kg are based on the weight of all the components initially present in the mixture (M),
- (d) optionally, the at least one compound (I), as defined above, and
- (e) optionally, the at least one isocyanate monofunctional reactive compound, as defined above.

It is further understood that all definitions and preferences as described above equally apply for this embodiment and all further embodiments, as described below.

The prepolymer (P) can be prepared by a variety of methods involving intimate admixing of the constituent components of the mixture (M), as defined above, with any optional component, as detailed above, in the presence of the b-pyrrolidone, as defined above, for example by using suitable polymerization apparatus, including stirred tanks. Typically, the mixing of the polyisocyanate compound (a), as detailed above, the polyol compound (b), as detailed above, the component ($WD_H$), as detailed above, optionally, the compound (I), as detailed above, optionally, the isocyanate monofunctional reactive compound is carried out in the presence of the b-pyrrolidone, as defined above, by using laboratory glassware with teflon mixing shaft, or, stainless steel commercial reactor tanks with stainless steel mixing shafts and blades.

In general, the mixing of the constituent components of the mixture (M) with any optional component, as detailed above, in the presence of the b-pyrrolidone, as defined above, is carried out at reaction temperatures ranging from 20 to 180° C., preferably from 50 to 150° C.; more preferably from 70 to 120° C.

It is further understood that the skilled person in the art will carry out said admixing according to general practice such as notably applying optimal time periods for addition and mixing in the presence of the the b-pyrrolidone, as defined above, the polyisocyanate compound (a), as detailed above, the polyol compound (b), as detailed above, the component ($WD_H$), as detailed above, optionally, the compound (I), as detailed above, optionally, the isocyanate monofunctional reactive compound, as detailed above.

In an advantageous embodiment of the present invention, the reaction of the polyisocyanate compound (a), as detailed above, with the polyol compound (b), as detailed above, the component ($WD_H$), as detailed above, optionally, the compound (I), as detailed above, and optionally, the isocyanate monofunctional reactive compound, as detailed above can be accelerated by using conventional catalysts, commonly known by the skilled in the art in the polyurethane chemistry.

Non-limiting examples of suitable catalysts mention can notably be made of compounds of divalent and tetravalent tin, more particularly the dicarboxylates of divalent tin and the dialkyl tin dicarboxylates or dialkoxylates, including notably dibutyl tin dilaurate, dibutyl tin diacetate, dioctyl tin diacetate, dibutyl tin maleate, tin(II) octoate, tin(II) phenolate or even the acetyl acetonates of divalent or tetravalent tin; the highly effective tertiary amines or amidines may be used as catalysts, optionally in combination with the tin compounds mentioned above. Suitable tertiary amines can be both acyclic and, in particular, cyclic compounds, including notably tetramethyl butanediamine, bis(dimethylaminoethyl)ether, 1,4-diazabicyclooctane (DABCO), 1,8-diazabicyclo-(5.4.0)-undecene, 2,2'-dimorpholinodiethyl ether or dimethyl piperazine or mixtures thereof; an organobismuth catalyst such as the commercially available Coscat® 83 catalysts from CasChem Company. Other commercially available bismuth catalysts are Coscat® 16, Coscat® 28, Coscat® Z-22 (CasChem Company).

Films (F) and Coatings (C)

The aqueous polyurethane dispersion of the present invention can then advantageously be further used to form (1) a film, (2) a coating or (3) to treat a substrate surface or at least part of a substrate surface.

Thus, another object of the invention is a method for manufacturing a film [film (F), herein below] comprising using the aqueous polyurethane dispersion, as detailed above.

Yet another object of the invention is a method for manufacturing a coating [coating (C), herein below] comprising using the aqueous polyurethane dispersion, as detailed above.

The inventors have surprisingly found that the b-pyrrolidone, as defined above, already comprised in the aqueous polyurethane dispersion of the present invention acts as an excellent coalescing agent thereby aiding the aqueous polyurethane dispersion in the formation of films (F) or coatings (C) having a reduced tendency to tearing and/or forming holes and/or having improved surface appearance (e.g. having a lower amount of surface defects) and/or having an increased smoothness and/or having improved mechanical properties, in particular tensile strength and elongation and/or good water permeability.

According to certain embodiments, the b-pyrrolidone, as defined above, is additionally added to the aqueous polyurethane dispersion of the present invention after said aqueous polyurethane dispersion have been prepared so as to achieve the desired coalescing in the formation of films (F) or coatings (C).

However, the inventors have found that very reduced amounts of the b-pyrrolidone, as defined above, are only required to achieve the desired coalescing of films (F) or coatings (C).

Techniques for manufacturing films and coatings are well known in the art. A typical method involves using a 10 wet mil gap under a solid steel bar to spread the liquid dispersion uniformly across a flat surface.

For the purpose of the present invention, the term "film (F)" possesses its usual meaning and is generally understood to encompass substantially bi-dimensional sheets having thickness substantially lower than width and length.

Thus another aspect of the present invention is a film (F) derived from the aqueous polyurethane dispersion, as detailed above.

In an advantageous embodiment of the present invention, the aqueous polyurethane dispersion is applied to a surface or at least part of a substrate surface thereby forming a coated surface.

Conventional coating techniques such as painting, spraying, flow-coating, transfer-coating, roller coating, brushing, dipping spreading, curtain coating and the like can be used.

Among suitable substrates mention may be made of wood, wood veneer, paper, paperboard, cardboard, textile, leather, nonwoven, surfaces of plastics, glass, ceramic, mineral building materials and uncoated or coated metals.

EXAMPLES

The invention will be now described in more detail with reference to the following examples, whose purpose is merely illustrative and not intended to limit the scope of the invention.

The following abbreviations are used in the Examples:
H12MDI: 4,4'-methylenebis(cyclohexyl isocyanate)
IPDI: isophorone diisocyanate
Piothane® 3000HA polyester: A polyester polyol obtained under the trade designation "Piothane® 3000HA" from Specialty Resin, A Division of Panolam Industries International Inc.
Piothane® 1000HA polyester: A polyester polyol obtained under the trade designation "Piothane® 1000HA" from Specialty Resin, A Division of Panolam Industries International Inc.
Piothane® 500BA polyester: A polyester polyol obtained under the trade designation "Piothane® 500BA" from Specialty Resin, A Division of Panolam Industries International Inc.
TMP: trimethylolpropane
CAPA™ 7203: A polycaprolactone/polycarbonate copolymer ester obtained under the trade designation "CAPA™ 7203" from Perstorp.
DMPA: dimethylolpropionic acid
YMER™ N120: A compounds ($WD_{HN}$) having the general formula (HN-1') and n is 19 obtained under the trade designation "YMER™ N120" from Perstorp.

DABCO® T-9: 1,4-Diazabicyclo[2.2.2]octane obtained under the trade designation "DABCO® T-9" from Air Products.
DABCO® T-12: a dibutyl tin dilaurate catalyst obtained under the trade designation "DABCO® T-12" from Air Products.
DEE FO® PI-40: A defoamer for aqueous systems obtained under the trade designation "DEE FO® PI-40" from Munzing Chemie GmbH.
CosCat® 83: An organobismuth catalyst obtained under the trade designation "CosCat® 83" from CasChem Company.
Metolat® 780 Ethylene Oxide: A surfactant obtained under the trade designation "Metolat® 780" from Munzing Chemie GmbH.
TEA: trimethylamine
BYK® 348 Flow aid: A polyether siloxane flow aid additive obtained under the trade designation "BYK® 348" from BYK-Chemie USA.

Test Methods

Wet Dispersion Properties

The Wet Dispersion Properties are determined by measuring the Brookfield viscosity, pH, total solids content, appearance, heat age stability, average particle size and coalescence.

The Brookfield viscosity: measurement of the Brookfield viscosity by using a Brookfield RV or RVT, at 25° C., 20 RPM and using an appropriate spindle.

Coalescence: determination of coalescence is made by visual observation of the elimination of film 'cracks' and fractures upon air dry of a 254 microns wet (10 wet mils) film on Lanetta cards at 50% relative humidity and 21.1° C. (70° F.) temperature.

Total solids content: determination by a thermogravimetric method using a hot air forced convention oven at temperature of 150° C. and determining weight loss of wet dispersion samples when exposed for a duration of 2 hours.

Appearance: determination of appearance was made by visual observation of wet dispersion.

Heat Age Stability: The Heat Age Stability was carried out by exposure of the aqueous polyurethane dispersion to 49° C. in a sealed and taped glass jar for 7 days.

Average particle size: The average particle size was measured by CPS disc centrifugation analysis.

Air Dry Konig Hardness Development

The Air dry Konig hardness development was determined by applying 2 coats of #52 rod deposition of each coating to steel Q-panels. After applying the first coat, said first coat was dried for 30 minutes at an appropriate temperature. The second coat was then applied and dried at 21° C. until 40% Relative Humidity. The Konig Hardness measurement was recorded in seconds for 1 to 5 days. After 5 days air drying, the panels were reheated for 3 minutes at 150° C. After cooling to room temperature, the Konig Hardness was measured in seconds.

Water Resistance Properties

The water spot resistance was determined by applying a 254 microns wet (10 wet mils) deposition on Lanetta cards by using Byrd Bars which were then dried at 21° C. until 40% Relative Humidity for about 24 hours. Water soaked balls were the applied to said film surfaces covered with glass jar.

Dry Film Properties

The dry film properties were determined by applying a 254 microns wet (10 wet mils) coating onto a mylar film by using Byrd Bars. The coated films were air dried overnight. The coated films were then further oven dried at 150° C. during 3 minutes. Modulus, Tensile at Break, Ultimate Elongation using Shimadzo Tensile test machine (Crosshead Speed=0.4 inches/min; Jaw Separation=3 inches, Sample width=1 inch) were recorded according to ASTM D2370-98 Standard Test Method for tensile properties of organic coatings Aqueous Polyurethane Dispersion Systems Including Anionic Hydrophilic Group or Potentially Anionic Hydrophilic Groups [Compound $(WD_{HA})$]

Example 1 (E1)

Components initially present in the mixture (M) of example 1:
  62.32 g of H12MDI (0.475 equivalents)
  251.01 g of Piothane® 3000HA polyester (0.158 equivalents)
  10.63 g of DMPA (0.158 equivalents or 245 mmol/kg based on the weight of H12MDI, Piothane® 3000HA polyester and DMPA).

To a reactor tank with stainless steel mixing shafts and blades, 62.32 g of H12MDI, 251.01 g of Piothane® 3000HA polyester, 10.63 g of DMPA and 57.17 g of N-n-butylpyrrolidone were added. Start mixing, heat the mixture to 80° C. and add 0.030 g DABCO® T-9 Stannous Octoate catalyst. The reaction was reacted to a residual polyisocyanate content (i.e. NCO group content) of 1.70%. The reaction mixture (prepolymer (P)) was cooled until 78° C. and the Brookfield viscosity was measured at 25° C., 20 RPM and a #4 Spindle (see Table 1). To the reaction mixture at 78° C. was added 7.94 g of TEA neutralizing agent. To a separate dispersion kettle, 454.91 g of water at 23-24° C. and 0.16 g of DEE FO® PI-40 defoamer were added and agitated. 329.67 g of the reaction mixture (i.e. the prepolymer (P) with TEA) was added to the water in the separate dispersion tank, allowing incorporation and dispersion of the reaction mixture into the water over a 7 minutes period.

The reaction mixture dispersed easily. It started opaque white and cleared to semi-trans/opaque.

To the dispersion was added 5.50 g of 64% hydrazine hydrate diluted with water to 35% hydrazine content. Mixed for 4 minutes after addition of the hydrazine hydrate.

The resulting dispersion has a polyurethane solids content of 35.28% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test, water resistance property test and dry film property test. The results are summarized in Table 1.

Comparative Example 2 (CE2)

Comparative example 2 was prepared in the same way as in Example 1, except that 57.17 g of N-methylpyrrolidone (NMP) was added instead of 57.17 g of N-n-butylpyrrolidone, the reaction was reacted to a residual polyisocyanate content (i.e. NCO group content) of 1.68% and to the dispersion was added 5.43 g of 64% hydrazine hydrate diluted with water to 35% hydrazine content.

The reaction mixture dispersed with great difficulty, became Flocculant upon entering water, very slow feed was required. The resulting dispersion was Opaque white with flocculant The resulting dispersion has a polyurethane solids content of 35.49% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test, water resistance property test and the dry film property test. The results are summarized in Table 1.

Example 3 (E3)

Components initially present in the mixture (M) of example 3:
155.39 g of H12MDI (1.185 equivalents)
190.66 g of Piothane®1000HA polyester (0.385 equivalents)
13.92 g of DMPA (0.207 equivalents or 288 mmol/kg based on the weight of H12MDI, Piothane® 3000HA polyester and DMPA).

To a reactor tank with stainless steel mixing shafts and blades, 155.39 g of H12MDI, 190.66 g of Piothane® 1000HA polyester, 13.92 g of DMPA and 40.00 g of N-n-butylpyrrolidone were added. Start mixing, heat the mixture to 80° C. and add 0.036 g DABCO® T-9 Stannous Octoate catalyst. The reaction mixture was reacted to a residual polyisocyanate content (i.e. NCO group content) of 6.07%. The reaction mixture (prepolymer (P)) was cooled until 77° C. and the Brookfield viscosity was measured at 25° C., 20 RPM and a #4 Spindle (see Table 1). To the reaction mixture at 77° C. was added 10.31 g of TEA neutralizing agent. To a separate dispersion kettle, 528.66 g of water at 23-24° C., 0.17 g of DEE FO® PI-40 defoamer and 1.79 g of Metolat® 780 Ethylene Oxide were added and agitated. 348.76 g of the reaction mixture (i.e. the prepolymer (P) with TEA) was added to the water in the separate dispersion kettle, allowing incorporation and dispersion of the reaction mixture into the water over a 4 minute period. The dispersion was mixed for 39 minutes after complete addition of said reaction mixture. To the dispersion was added 20.67 g of 64% hydrazine hydrate diluted with water to 35% hydrazine content and the dispersion was mixed for 8 minutes after addition of the hydrazine hydrate. The resulting dispersion has a polyurethane solids content of 38.18% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test, water resistance property test. The results are summarized in Table 1.

Comparative Example 4 (CE4)

Comparative example 4 was prepared in the same way as in Example 3, except that 40 g of N-methylpyrrolidone (NMP) was added instead of 40 g of N-n-butylpyrrolidone, the reaction was reacted to a residual polyisocyanate content (i.e. NCO group content) of 6.18% and to the dispersion was added 20.59 g of 64% hydrazine hydrate diluted with water to 35% hydrazine content. The resulting dispersion has a polyurethane solids content of 36.37% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test and the water resistance property test. The results are summarized in Table 1.

Example 5 (E5)

Components initially present in the mixture (M) of example 5:
180.00 g of H12MDI (1.372 equivalents)
142.63 g of Piothane® 500BA polyester (0.541 equivalents)
1.08 g of TMP (0.024 equivalents)
16.25 g of DMPA (0.240 equivalents or 357 mmol/kg based on the weight of H12MDI, Piothane® 500BA polyester, TMP and DMPA).

To a reactor tank with stainless steel mixing shafts and blades, 180.00 g of H12MDI, 142.63 g of Piothane® 500BA polyester, 1.08 g TMP and 60.00 g of N-n-butylpyrrolidone were added. Start mixing, heat the mixture to 80° C. and add 0.033 g CosCat® Bismuth catalyst. The reaction mixture was reacted to a residual polyisocyanate content (i.e. NCO group content) of 8.31%. The reaction mixture was cooled until 95° C. and 16.25 g of DMPA was added. The reaction mixture was further reacted to a residual polyisocyanate content (i.e. NCO group content) of 5.68%. The reaction mixture (prepolymer (P)) was cooled until 77° C. and the Brookfield viscosity was measured at 25° C., 20 RPM and a #4 Spindle (see Table 1). To the reaction mixture at 77° C. was added 11.98 g of TEA neutralizing agent. To a separate dispersion kettle, 511.08 g of water at 23-24° C. and 0.17 g of DEE FO® PI-40 defoamer were added and agitated. 339.89 g of the reaction mixture (i.e. the prepolymer (P) with TEA) was added to the water in the separate dispersion kettle, allowing incorporation and dispersion of the reaction mixture into the water over a 13 minute period. The dispersion was mixed for 64 minutes after complete addition of said reaction mixture. To the dispersion was added 18.77 g of 64% hydrazine hydrate diluted with water to 35% hydrazine content and was mixed for 10 minutes after addition of the hydrazine hydrate. The resulting dispersion has a polyurethane solids content of 36.81% by weight. The resulting dispersion has been subjected to the Wet Dispersion Properties test (i.e. Viscosity, total solids content, pH, appearance, and coalescence), as described in detail above. The results are summarized in Table 1. The resulting dispersion had poor coalescence at room temperature, showing that not enough N-n-butylpyrrolidone was added.

Single Co-Solvent Coalescence—Example 5a (E5a)

To the resulting dispersion system (826.09 g), as obtained in example 5, 95.38 g of water was added to obtain a polyurethane solids content of 33.00% by weight (PUD-5). The Brookfield viscosity, as measured at 25° C., 20 RPM and a #2 Spindle was 110 mPA-s.

To 100 g of this polyurethane dispersion system (PUD-5) at 33.00% solids content, only 1.75 g of N-n-butylpyrrolidone and 0.50 g of BYK® 348 Flow aid were added in order to achieve coalescence from a 254 microns wet (10 wet mils) film applied to Lanetta cards air dried at 23° C. (see results Table 2). The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The wet film dry time property was determined by applying a 152.4 microns wet (6 wet mils) coating onto a mylar film by using Byrd Bars at 22° C. and at 30-40% Relative Humidity. The Gardner dry time was measured (see results Table 2).

Dual Co-Solvent Coalescence—Example 5b (E5b)

To the resulting dispersion system (826.09 g), as obtained in example 5, 95.38 g of water was added to obtain a polyurethane solids content of 33.00% by weight (PUD-5). The Brookfield viscosity, as measured at 25° C., 20 RPM and a #2 Spindle was 110 mPa-s.

To 100 g of the polyurethane dispersion system at 33.00% solids content (PUD-5), 3 g of dipropylene glycol dimethyl ether, 3 g of N-n-butylpyrrolidone and 0.53 g of BYK® 348 Flow aid were added. The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The wet film dry time property was determined by applying a 152.4 microns wet (6 wet mils) coating onto a mylar film by using Byrd Bars at 22° C. and at 30-40% Relative Humidity. The Gardner dry time was measured (see results Table 2).

Comparative Example 6 (CE6)

Comparative example 6 was prepared in the same way as in Example 5, except that 60 g of N-methylpyrrolidone (NMP) was added instead of 60 g of N-n-butylpyrrolidone, the reaction was reacted to a first residual polyisocyanate content (i.e. NCO group content) of 8.59% and to a final residual polyisocyanate content after the DMPA was added of 5.91%, and to the dispersion was added 19.53 g of 64% hydrazine hydrate diluted with water to 35% hydrazine content. The resulting dispersion has a polyurethane solids content of 35.62% by weight. The resulting dispersion has been subjected to the Wet Dispersion Properties test (i.e. Viscosity, total solids content, pH, appearance, and coalescence), as described in detail above. The results are summarized in Table 1. The resulting dispersion had also a poor coalescence at room temperature, showing that not enough NMP was added.

Single Co-Solvent Coalescence—Comparative Example 6a (CE 6a)

To the resulting dispersion system (830.60 g), as obtained in comparative example 6, 65.94 g of water was added to obtain a polyurethane solids content of 33.00% by weight (PUD-C6). The Brookfield viscosity, as measured at 25° C., 20 RPM and a #2 Spindle was 40 mPa-s.

To 100 g of this polyurethane dispersion system at 33.00% solids content (PUD-C6), 6.00 g of NMP and 0.50 g of BYK® 348 Flow aid was necessary to add in order to achieve coalescence from a 254 microns wet (10 wet mils) film applied to Lanetta cards air dried at 23° C. (see results Table 2). The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The wet film dry time property was determined by applying a 152.4 microns wet (6 wet mils) coating onto a mylar film by using Byrd Bars at 22° C. at a 30-40% Relative Humidity. The Gardner dry time was measured (see results Table 2).

Dual Co-Solvent Coalescence—Comparative Example 6b (CE6b)

To the resulting dispersion system (830.60 g), as obtained in comparative example 6, 65.94 g of water was added to obtain a polyurethane solids content of 33.00% by weight (PUD-C6). The Brookfield viscosity, as measured at 25° C., 20 RPM and a #2 Spindle was 40 mPa-s.

To 100 g of this polyurethane dispersion system at 33.00% solids content (PUD-C6), 3 g of dipropylene glycol dimethyl ether, 3 g of NMP and 0.53 g of BYK® 348 Flow aid were added. The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The dry film property was determined by applying a 152.4 microns wet (6 wet mils) coating onto a mylar film by using Byrd Bars at 22° C. until 30-40% Relative Humidity was reached. The Gardner dry time was measured (see results Table 2).

Comparative Example 7 (CE7)

Comparative example 6 was prepared in the same way as in Example 5, except that 60 g of N-ethylpyrrolidone (NEP) was added instead of 60 g of N-n-butylpyrrolidone, the reaction was reacted to a first residual polyisocyanate content (i.e. NCO group content) of 8.62% and and to a final residual polyisocyanate content of 5.69% after the DMPA was added and to the dispersion was added 19.53 g of 64% hydrazine hydrate diluted with water to 35% hydrazine content. The resulting dispersion has a polyurethane solids content of 35.90% by weight. The resulting dispersion has been subjected to the Wet Dispersion Properties test (i.e. Viscosity, total solids content, pH, appearance, and coalescence), as described in detail above. The results are summarized in Table 1. The resulting dispersion had also a poor coalescence at room temperature, showing that not enough NEP was added.

Single Co-Solvent Coalescence—Comparative Example 7a (CE7a)

To the resulting dispersion system (830.60 g), as obtained in comparative example 7, 65.94 g of water was added to obtain a polyurethane solids content of 33.00% by weight (PUD-C7). The Brookfield viscosity, as measured at 25° C., 20 RPM and a #2 Spindle was 60 mPa-s.

To 100 g of this polyurethane dispersion system at 33.00% solids content (PUD-C7), 7.00 g of NEP and 0.50 g of BYK® 348 Flow aid was necessary to add in order to achieve coalescence from a 254 microns wet (10 wet mils) film applied to Lanetta cards air dried at 23° C. (see results Table 2). The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The wet film dry time property was determined by applying a 152.4 microns wet (6 wet mils) coating onto a mylar film by using Byrd Bars at 22° C. and at 30-40% Relative Humidity. The Gardner dry time was measured (see results Table 2).

Dual Co-Solvent Coalescence—Comparative Example 7b (CE7b)

To the resulting dispersion system (830.60 g), as obtained in comparative example 7, 65.94 g of water was added to obtain a polyurethane solids content of 33.00% by weight (PUD-C7). The Brookfield viscosity, as measured at 25° C., 20 RPM and a #2 Spindle was 40 mPa-s.

To 100 g of this polyurethane dispersion system at 33.00% solids content (PUD-C7), 3 g of dipropylene glycol dimethyl ether, 3 g of NEP and 0.53 g of BYK® 348 Flow aid were added. The Konig hardness was now determined by applying a 177.8 microns wet (7 wet mils) of coalesced coating to steel Q-panels by using a Byrd Bar. The Konig Hardness measurement was recorded in seconds for 1 to 6 days. After 6 days air drying, the panels were reheated in an oven for 5 minutes at 150° C. (see results Table 2). The dry film property was determined by applying a 152.4 microns wet (6 wet mils) coating onto a mylar film by using Byrd Bars at 22° C. until 30-40% Relative Humidity was reached. The Gardner dry time was measured (see results Table 2).

Example 8 (E8)

Components initially present in the mixture (M) of example 8:
88.63 g of H12MDI (0.676 equivalents)
214.18 g of Piothane® 3000HA polyester (0.135 equivalents)
21.16 g of DMPA (0.315 equivalents or 486 mmol/kg based on the weight of H12MDI, Piothane® 3000HA polyester and DMPA).

To a reactor tank with stainless steel mixing shafts and blades, 88.63 g of H12MDI, 214.18 g of Piothane® 3000HA polyester, 21.16 g of DMPA and 81.00 g of N-n-butylpyrrolidone were added. Start mixing, heat the mixture to 80° C. and add 0.032 g DABCO® T-9 Stannous Octoate catalyst. The reaction mixture was reacted to a residual polyisocyanate content (i.e. NCO group content) of 2.25%. The reaction mixture (prepolymer (P)) was cooled until 87° C. and the Brookfield viscosity was measured at 25° C., 20 RPM and a #4 Spindle (see Table 1). To a separate dispersion kettle, 413.12 g of water at 23-24° C., 11.44 g of dimethylethanol amine neutralizing agent, 0.15 g of DEE FO® PI-40 defoamer were added and agitated. 330 g of the reaction mixture (i.e. the prepolymer (P) was added to the water in the separate dispersion kettle, allowing incorporation and dispersion of the reaction mixture into the water over a 7 minute period. The dispersion was mixed for 33 minutes after complete addition of said reaction mixture. To the dispersion was added 7.44 g of 64% hydrazine hydrate diluted with water to 35% hydrazine content and was mixed for 10 minutes after addition of the hydrazine hydrate. The resulting dispersion has a polyurethane solids content of 37.49% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test, water resistance property test and the dry film property test. The results are summarized in Table 1.

Due to the high BKFLD viscosity of 7000 mPA-s, as illustrated in Table 1, 100 g of the resulting dispersion having a polyurethane solids content of 37.49% by weight was further diluted with 9.37 g water until reflow characteristics were obtained. The air dry Konig hardness development test was again measured and results are shown in Table 1.

Comparative Example 9 (CE9)

Comparative example 9 was prepared in the same way as in Example 8, except that 81 g of N-methylpyrrolidone (NMP) was added instead of 81 g of N-n-butylpyrrolidone (n-NBP), the reaction was reacted to a residual polyisocyanate content (i.e. NCO group content) of 2.20% and to the dispersion was added 7.28 g of 64% hydrazine hydrate diluted with water to 35% hydrazine content. The resulting dispersion has a polyurethane solids content of 36.72% by weight. The resulting dispersion has been subjected to the following test methods which are described in detail above: Wet Dispersion Properties test (i.e. Viscosity, total solids content, average particle size, pH, appearance, heat age stability and coalescence); the air dry Konig hardness development test, water resistance property test and the dry film property test. The results are summarized in Table 1.

Due to the high BKFLD viscosity of 710 mPA-s, as illustrated in Table 1, 100 g of the resulting dispersion having a polyurethane solids content of 36.72% by weight was further diluted with 9.37 g water until reflow characteristics were obtained. The air dry Konig hardness development test was again measured and results are shown in Table 1.

TABLE 1

Characteristics of the aqueous polyurethane dispersion of examples 1, 3, 5, 8 and the comparative examples 2, 4, 6, 7 and 9

| # EXAMPLE | E1 | CE2 | E3 | CE4 | E5 | CE6 | CE7 | E8 | CE9 |
|---|---|---|---|---|---|---|---|---|---|
| CO-SOLVENT | n-NBP | NMP | n-NBP | NMP | n-NBP | NMP | NEP | n-NBP | NMP |
| Amount DMPA (x mmol/kg) | 245 | 245 | 288 | 288 | 357 | 357 | 357 | 486 | 486 |
| Wet Dispersion Properties[a] | | | | | | | | | |
| Total Solids Content | 35.28% | 35.49% | 37.18% | 36.37% | 36.81% | 35.62% | 35.90% | 37.49% | 36.72% |
| Appearance | opaque/semi-translucent | opaque/white sediment | translucent | opaque/semi-translucent | semi-translucent | semi-translucent | semi-translucent | clear/translucent | translucent |
| pH | 7.98 | 7.99 | 7.98 | 8.03 | 8.56 | 8.59 | 8.53 | 8.29 | 8.27 |
| Coalescense | excellent | excellent | excellent | borderline/some mudcracks | poor | poor | poor | excellent | excellent |
| Heat Age Stability | clean | heavy sedimentation/separation | clean/translucent | opaque/semi-translucent | — | — | — | clean/clear | clean/translucent |
| BKFLD viscosity (mPA-s) | 400 | 380 | 330 | 40 | 4000 | 70 | 260 | 7000 | 710 |
| Average particle size (μm) | 0.045 | 0.081 | — | — | 0.034 | 0.031 | 0.029 | — | — |
| Air dry Konig hardness development[b] | | | | | | | | | |
| 1 day air dry | 69 sec | 64 sec | 66 sec | 74 sec | NA | NA | NA | 69 sec | 64 sec |
| 2 day air dry | 76 sec | 85 sec | 66 sec | 74 sec | NA | NA | NA | 76 sec | 85 sec |
| 3 day air dry | 82 sec | 88 sec | 68 sec | 76 sec | NA | NA | NA | 82 sec | 88 sec |
| 4 day air dry | 91 sec | 86 sec | 75 sec | 75 sec | NA | NA | NA | 91 sec | 86 sec |
| 5 day air dry | 93 sec | 89 sec | 76 sec | 76 sec | NA | NA | NA | 93 sec | 89 sec |
| Oven dry 3 minutes @ 150° C. | 45 sec | 54 sec | 59 sec | 60 sec | NA | NA | NA | 45 sec | 54 sec |

TABLE 1-continued

Characteristics of the aqueous polyurethane dispersion of examples 1, 3, 5, 8 and the comparative examples 2, 4, 6, 7 and 9

| # EXAMPLE | E1 | CE2 | E3 | CE4 | E5 | CE6 | CE7 | E8 | CE9 |
|---|---|---|---|---|---|---|---|---|---|
| Water resistance properties[c] | | | | | | | | | |
| 1 hour water soak | No affect | No affect | No affect | No affect | NA | NA | NA | No affect | No affect |
| 24 hour water soak | No affect | No affect | No affect | No affect | NA | NA | NA | No affect | No affect |
| Dry film properties[d] | | | | | | | | | |
| Elongation modulus 100% | 1243 psi | 1144 psi | — | — | NA | NA | NA | 1963 psi | 1690 psi |
| Elongation modulus 100% | 1365 psi | 1242 psi | — | — | NA | NA | NA | 2269 psi | 2262 psi |
| Elongation modulus 100% | 1606 psi | 1572 psi | — | — | NA | NA | NA | 2694 psi | 2907 psi |
| Tensile at break | 2527 psi | 1709 psi | — | — | NA | NA | NA | 3028 psi | 3950 psi |
| Ultimate Elongation | 565% | 465% | — | — | NA | NA | NA | 514% | 643% |

[a,b,c,d]the test methods are explained in detail above;

NA means not applicable

TABLE 2

Characteristics of the aqueous polyurethane dispersion of examples 5a and 5b and the comparative examples 6a, 6b, 7a and 7b.

| # EXAMPLE | E5a | CE6a | CE7a |
|---|---|---|---|
| PUD-5 (parts) | 100 | | |
| PUD-C6 (parts) | | 100 | |
| PUD-C7 (parts) | | | 100 |
| BYK ® 348 Flow aid (parts) | 0.50 | 0.50 | 0.50 |
| n-BNP (parts) | 1.75 | | |
| NMP (parts) | | 6.00 | |
| NEP (parts) | | | 7.00 |
| Total solvent required for coalescence (parts) | 7.44 | 11.69 | 12.69 |
| Total solvent as % of PUD solids | 23.05% | 37.73% | 41.34% |
| Air dry Konig hardness development: 7 wet mils film applied via Byrd Bar to Steel Q-Panels. | | | |
| 1 day air dry | 33 sec | 39 sec | 58 sec |
| 2 day air dry | 53 sec | 61 sec | 79 sec |
| 3 day air dry | 65 sec | 73 sec | 88 sec |
| 4 day air dry | 82 sec | 87 sec | 99 sec |
| 5 day air dry | 87 sec | 90 sec | 105 sec |
| 6 day air dry | 88 sec | 89 sec | 113 sec |
| Oven dry 3 minutes @ 150° C. | 116 sec | 109 sec | 119 sec |
| Gardner dry time: 6 wet mils coated to Mylar film. | | | |
| Dry to touch | 8 min | 38 min | 35 min |
| Dust free | 27 min | 58 min | 60 min |
| Dry through | 28 min | 66 min | 70 min |

| # Example | E5b | CE6b | CE7b |
|---|---|---|---|
| PUD-5 (parts) | 100 | | |
| PUD-C6 (parts) | | 100 | |
| PUD-C7 (parts) | | | 100 |
| BYK ® 348 Flow aid (parts) | 0.53 | 0.53 | 0.53 |
| n-BNP (parts) | 3.00 | | |
| NMP (parts) | | 3.00 | |
| NEP (parts) | | | 3.00 |
| dipropylene glycol dimethyl ether (parts) | 3.00 | 3.00 | 3.00 |
| Coalescense | Excellent | Acceptable | Acceptable - mud cracking in high spots |
| Air dry Konig hardness development: 7 wet mils film applied via Byrd Bar to Steel Q-Panels. | | | |
| 1 day air dry | 37 sec | 47 sec | 67 sec |
| 2 day air dry | 62 sec | 68 sec | 87 sec |
| 3 day air dry | 75 sec | 79 sec | 96 sec |
| 4 day air dry | 90 sec | 91 sec | 105 sec |
| 5 day air dry | 96 sec | 94 sec | 105 sec |
| 6 day air dry | 98 sec | 92 sec | 102 sec |
| Oven dry 3 minutes @ 150° C. | 119 sec | 108 sec | 122 sec |

TABLE 2-continued

Characteristics of the aqueous polyurethane dispersion of examples 5a and 5b and the comparative examples 6a, 6b, 7a and 7b.

Gardner dry time: 6 wet mils coated to Mylar film.

| | | | |
|---|---|---|---|
| Dry to touch | 12 min | 17 min | 20 min |
| Dust free | 48 min | 49 min | 47 min |
| Dry through | 52 min | 53 min | 53 min |

The results, as summarized in Table 1, clearly demonstrate that polyurethane prepolymers using N-n-butylpyrrolidone (n-NBP) as the dispersion solvent can be made at lower levels of DMPA compared to those using NMP as the dispersion solvent. In particular, in example 1, the n-NBP-based polyurethane prepolymer (P) incorporating a low DMPA level of 245 mmol/kg was easy to disperse and showed a clean, semi-translucent appearance. On the contrary, in comparative example 2, the NMP-based polyurethane prepolymer (P) incorporating said low DMPA level of 245 mmol/kg was more difficult to disperse and showed heavy flocculation.

In spite of the extremely high viscosity of the prepolymer (P), the N-n-butylpyrrolidone co-solvent demonstrated excellent solubilizing effect of the prepolymer (P) solids and allowed easy flow and incorporation of the hydrophobic prepolymer into the water phase.

The results as shown in Table 1 and Table 2 also demonstrates that N-n-butylpyrrolidone (n-NBP) offers significantly improved coalescence of n-NBP-based polyurethane dispersion films, and this can enable significant VOC reduction due to the lower co-solvent demand for a required degree of coalescence.

With reference to example E5b in Table 2, the Inventors especially note that even when equal levels of n-NBP, as compared to NMP or NEP, are used, the n-NBP-based polyurethane dispersion systems still exhibit more rapid comparative touch dry times with exceptional solvency and improved film formation.

Aqueous Polyurethane Dispersion Systems Including Potentially Anionic Hydrophilic Groups and Non-Ionic Hydrophilic Groups

Example 10 (E10)

Components initially present in the mixture (M) of example 10:
  58.45 g of IPDI (0.526 equivalents)
  226.88 g of CAPA™ 7203 polycaprolactone/polycarbonate copolymer ester (0.223 equivalents)
  32.49 g of YMER™ N120 (0.064 equivalents or 100 mmol/kg based on the weight of H12MDI, YMER™ N120, CAPA™ 7203 copolymer ester and DMPA)
  2.14 g of DMPA (0.032 equivalents) or 50 mmol/kg based on the weight of H12MDI, YMER™ N120, CAPA™ 7203 copolymer ester and DMPA).

To a reactor tank with stainless steel mixing shafts and blades, 58.45 g of IPDI, 226.88 g of CAPA™ 7203 copolymer ester, 32.49 g of YMER™ N120, 2.14 g of DMPA and 80.00 g of N-n-butylpyrrolidone were added. Start mixing, heat the mixture to 88-92° C. and add 0.03 g DABCO® T-12 Dibutyl Tin dilaurate catalyst. The reaction was reacted to a residual polyisocyanate content (i.e. NCO group content) of 2.11%. The reaction mixture (prepolymer (P)) was cooled until 74° C. and the Brookfield viscosity was measured at 25° C., 10 RPM and a #6 Spindle (see Table 3). To a separate dispersion kettle, 424.39 g of water at 22-23° C. and 0.15 g of DEE FO® PI-40 defoamer were added and agitated. 330.00 g of the reaction mixture (i.e. the prepolymer (P)) was added to the water in the separate dispersion tank, allowing incorporation and dispersion of the reaction mixture into the water over a 6 minute period. The dispersion was mixed for 19 minutes after complete addition of said reaction mixture. To the dispersion was added 0.87 g of diethylenetriamine, 3.73 g of ethylenediamine and 8.51 g water. The resulting dispersion has a polyurethane solids content of 35.00% by weight. The resulting dispersion has been subjected to the following test methods which are described in detail above: Wet Dispersion Properties test (i.e. Viscosity, total solids content, average particle size, pH, appearance, heat age stability and coalescence); and dry film property test. The water spot resistance was determined by applying a 152.4 microns wet (6 wet mils) deposition on Lanetta cards by using Byrd Bars which were then dried at 21° C. until 30% Relative Humidity for about 12 hours. The water spot resistance was determined by application of water direct to the dried coating. The results are summarized in Table 3.

Comparative Example 11 (CE11)

Comparative example 11 was prepared in the same way as in Example 10, except that 80.00 g of N-methylpyrrolidone (NMP) was added instead of 80.00 g of N-n-butylpyrrolidone, the reaction was reacted to a residual polyisocyanate content (i.e. NCO group content) of 2.14% and was added 0.87 g of diethylenetriamine, 3.78 g of ethylenediamine and 8.63 g water. A coagulated gel was obtained.

Comparative Example 12 (CE12)

Comparative example 12 was prepared in the same way as in Example 10, except that 80.00 g of N-ethylpyrrolidone (NEP) was added instead of 80.00 g of N-n-butylpyrrolidone, the reaction was reacted to a residual polyisocyanate content (i.e. NCO group content) of 2.14% and was added 0.87 g of diethylenetriamine, 3.78 g of ethylenediamine and 8.63 g water. A coagulated gel was obtained.

TABLE 3

Characteristics of the aqueous polyurethane dispersion of example 10 (E10) and comparative examples 11 (CE11) and 12 (CE12).

| # Example | E10 | CE11 | CE12 |
|---|---|---|---|
| Co-solvent | n-NBP | NMP | NEP |
| Amount DMPA (x mmol/kg) | 50 | 50 | 50 |
| Amount YMER™ N120 (y mmol/kg) | 100 | 100 | 100 |
| Wet Dispersion Properties | | | |
| Total Solids Content | 35.89% | 35.00% | 35.00% |
| Appearance | opaque/white liquid | coagulated gel | coagulated gel |
| pH | 6.57 | NA | NA |
| Coalescense | excellent | NA | NA |
| Heat Age Stability | clean | coagulated gel | coagulated gel |
| BKFLD viscosity (mPA-s) | 40 | solid | solid |

TABLE 3-continued

Characteristics of the aqueous polyurethane dispersion of example 10 (E10) and comparative examples 11 (CE11) and 12 (CE12).

| # Example | E10 | CE11 | CE12 |
|---|---|---|---|
| Dry film properties | | | |
| Elongation modulus 100% | 150 psi | NA | NA |
| Elongation modulus 100% | 350 psi | NA | NA |
| Elongation modulus 100% | 780 psi | NA | NA |
| Tensile at break | 5200 psi | NA | NA |
| Ultimate Elongation | 1200% | NA | NA |
| Water Spot Resistance test | | | |
| 30 min exposure | No effect | NA | NA |
| 24 hour exposure under cover | Slight blush with full recovery | NA | NA |

NA means not applicable

Table 3 clearly demonstrates that the N-n-butylpyrrolidone significantly assists the dispersion of polyurethane entities into a water phase in a manner far superior to the more traditional co-solvents commonly used, and, allows for the creation of stable, usable polyurethane dispersions at hydrophilic entity levels below that which are allowed for the more commonly used co-solvents.

The invention claimed is:

1. A method for the manufacturing of the aqueous polyurethane dispersion, which comprises dispersing a prepolymer (P) in water, said prepolymer (P) comprising:
   A. at least one isocyanate terminated polyurethane prepolymer prepared by reacting, in the presence of at least one pyrrolidone (hereinafter b-pyrrolidone) comprising N-n-butylpyrrolidone, N-isobutylpyrrolidone, N-sec-butylpyrrolidone or N-tert-butylpyrrolidone, a mixture (M) which comprises:
      (a) at least one polyisocyanate compound (a),
      (b) at least one polyol compound (b), having a molecular weight $M_w$ of 200 to 8000 and a hydroxyl functionality of 1.5 to 6,
      (c) at least one water dispersible enhancing component having at least one hydrophilic group or potentially hydrophilic group (hereinafter component ($WD_H$)) and comprising:
         i. x mmol/kg of at least one water dispersible enhancing compound having at least one anionic hydrophilic group or potentially anionic hydrophilic group (hereinafter compound ($WD_{HA}$)), and/or
         ii. y mmol/kg of at least one water dispersible enhancing compound having at least one non-ionic hydrophilic group or potentially non-ionic hydrophilic group [hereinafter compound ($WD_{HN}$)), and/or
         iii. z mmol/kg of at least one water dispersible enhancing compound having at least one cationic hydrophilic group or potentially cationic hydrophilic group (hereinafter compound ($WD_{HC}$)), and/or
         iv. w mmol/kg of at least one water dispersible enhancing compound having at least one zwitterionic hydrophilic group or potentially zwitterionic hydrophilic group (hereinafter compound ($WD_{HZ}$)),
   wherein
   $$\frac{200x + 70y + 72z + 75w}{x+y+z+w} < x+y+z+w < \frac{560x + 248y + 165z + 300w}{x+y+z+w}$$
   and at least one of x, y, z or w is different from 0 and all mmol/kg are based on the weight of all the components initially present in the mixture (M), wherein the b-pyrrolidone is carried through to a water phase as part of the aqueous polyurethane dispersion.

2. The method according to claim 1, wherein the b-pyrrolidone comprises N-n-butylpyrrolidone.

3. The method according to claim 1, wherein the weight percent (wt. %) of the b-pyrrolidone, relative to the total weight of all the components initially present in the mixture (M) is less than 50 wt. %.

4. The method according to claim 1, wherein the polyisocyanate compound (a) comprises aliphatic, cycloaliphatic, araliphatic and aromatic diisocyanates or polyisocyanates.

5. The method according to claim 1, wherein the compound ($WD_{HA}$) comprises compounds having the general formula (HA):

$$FG-R^1-AG \qquad \text{formula (HA)}$$

wherein FG is at least one functional group, wherein said functional group is selected from the group consisting of —OH, —SH, —NH$_2$ and —NHR$^2$, wherein R$^2$ is an alkyl or aryl group, R$^2$ is selected from the group consisting of methyl, ethyl, isopropyl, n-propyl, n-butyl, isobutyl, sec-butyl, tert-butyl, cyclopentyl or cyclohexyl, R$^1$ is an aliphatic, cycloaliphatic or aromatic radical containing 1 to 20 carbon atoms, and AG is at least one anionic or potential anionic group wherein said anionic or potential anionic group is selected from the group consisting of —COOY, —SO$_3$Y and —PO(OY)$_2$ wherein each of Y, equal to or different from each other, is selected from the group consisting of hydrogen, ammonium salt, alkali metal, and alkaline earth metal.

6. The method according to claim 1, wherein compounds ($WD_{HN}$) comprises compounds having the general formula (HN):

$$FG-R^1-Z-X-R' \qquad \text{formula (HN)}$$

wherein FG is at least one functional group, wherein said functional group is selected from the group consisting of —OH, —SH, —NH$_2$ and —NHR$^2$, wherein R$^2$ is an alkyl or aryl group, R$^2$ is selected from the group consisting of methyl, ethyl, isopropyl, n-propyl, n-butyl, isobutyl, sec-butyl, tert-butyl, cyclopentyl and cyclohexyl, R$^1$ is an aliphatic, cycloaliphatic or aromatic radical containing 1 to 20 carbon atoms, X is a polyalkylene oxide chain having 5 to 100 repeating alkylene oxide units, which may be composed to an extent of at least 40% of repeating ethylene oxide units and which in addition to said repeating ethylene oxide units may be composed of propylene oxide, butylene oxide or styrene oxide units, Z is oxygen or —NR$^6$—, wherein R$^6$ is H, an alkyl or aryl group, R$^6$ is selected from the group consisting of methyl, ethyl, isopropyl, n-propyl, n-butyl, isobutyl, sec-butyl, tert-butyl, cyclopentyl and cyclohexyl and R' is a monovalent hydrocarbon radical having 1 to 12 carbon atoms.

7. The method according to claim 1, wherein the compound ($WD_{HC}$) comprises compounds having at least one tertiary amino group or at least one quaternary amino group.

8. The method according to claim 6, wherein the component ($WD_H$) present in the mixture (M) consists essentially of:
   i. x mmol/kg of the compound ($WD_{HA}$), and/or
   ii. y mmol/kg of the compound ($WD_{HN}$)
wherein $$\frac{200x + 70y}{x+y} < x+y < \frac{560x + 248y}{x+y}$$

and at least one of x or y is different from 0 and all mmol/kg are based on the weight of all the components initially present in the mixture (M).

9. The method according to claim 8, wherein the component ($WD_H$)) comprises compound ($WD_{HA}$) which is present in a molar amount of 200 to 560 mmol/kg, based on the weight of all the components initially present in the mixture (M).

10. The method according to claim 8, wherein the component ($WD_H$)) comprises compound ($WD_{HN}$) which is present in a molar amount of 70 to 248 mmol/kg, based on the weight of all the components initially present in the mixture (M).

11. The method according to claim 7, wherein the component ($WD_H$) comprises compound ($WD_{HC}$) which is present in a molar amount of 72 to 165 mmol/kg, based on the weight of all the components initially present in the mixture (M).

12. The method according to claim 7, wherein the component ($WD_H$) comprises compound ($WD_{HZ}$) which is present in a molar amount of 75 to 300 mmol/kg, based on the weight of all the components initially present in the mixture (M).

13. The method according to claim 1, wherein the prepolymer (P) comprises unreacted isocyanate groups (NCO groups) in an amount of at most 15% by weight (% wt.) relative to total weight of the prepolymer (P).

14. The method according to claim 13, wherein said aqueous polyurethane dispersion further comprises at least one compound (I), different from the polyol compound (b) and different from the component ($WD_H$), having reactive groups chosen among alcoholic hydroxyl groups or primary or secondary amino groups, and is present in a molar amount of at most 10%, relative to the total molar amount of the polyol compound (b) and the component ($WD_H$).

15. The method for the manufacturing of the aqueous polyurethane dispersion according to claim 1, wherein at least one compound (I), different from the polyol compound (b) and different from the component ($WD_H$), having reactive groups chosen among alcoholic hydroxyl groups or primary or secondary amino groups, is added to the aqueous polyurethane dispersion after dispersing said prepolymer (P) in water, thereby forming a dispersed polyurethane polymer (polymer (PU).

16. The method according to claim 1, wherein said aqueous polyurethane dispersion is processed under the form of a film by spreading the liquid dispersion uniformly across a flat surface.

17. The method according to claim 1, wherein said aqueous polyurethane dispersion is applied to a surface or at least part of a substrate surface thereby forming a coated substrate.

18. The method of claim 17, wherein the substrate is selected from the group consisting of wood, wood veneer, paper, paperboard, cardboard, textile, leather, nonwoven, surfaces of plastics, glass, ceramic, mineral building materials and uncoated or coated metals.

* * * * *